(12) United States Patent
Lazarovici et al.

(10) Patent No.: US 12,545,299 B2
(45) Date of Patent: Feb. 10, 2026

(54) DYNAMICALLY WEIGHTING TRAINING DATA USING KINEMATIC COMPARISON

(71) Applicant: GM Cruise Holdings LLC, San Francisco, CA (US)

(72) Inventors: Allan Lazarovici, Austin, TX (US); Bo Xie, Newark, CA (US); Matthew Elkherj, Belmont, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 88 days.

(21) Appl. No.: 18/187,509

(22) Filed: Mar. 21, 2023

(65) Prior Publication Data

US 2024/0317272 A1    Sep. 26, 2024

(51) Int. Cl.
*B60W 60/00* (2020.01)
(52) U.S. Cl.
CPC ... *B60W 60/0027* (2020.02); *B60W 2420/403* (2013.01); *B60W 2420/408* (2024.01); *B60W 2554/4041* (2020.02); *B60W 2554/4044* (2020.02)
(58) Field of Classification Search
CPC ........... B60W 30/095; B60W 30/0953; B60W 30/0956; B60W 40/02; B60W 40/06; B60W 40/10; B60W 50/0097; B60W 60/0027; B60W 60/00272; B60W 60/00274; B60W 60/00276; B60W 2420/403; B60W 2420/408; B60W 2554/40; B60W 2554/4041; B60W 2554/4042; B60W 2554/4044; B60W 2554/4045; B60W 2556/25; G06V 10/70; G06V 10/82; G06V 10/98; G06V 10/993; G06V 20/182; G06V 2201/08; G08G 1/0104; G08G 1/16; G05D 1/86; G05D 2111/10; G05D 2111/14; G05D 2111/17
See application file for complete search history.

(56) References Cited

U.S. PATENT DOCUMENTS

| | | | |
|---|---|---|---|
| 11,370,423 B2* | 6/2022 | Casas | B60W 60/0027 |
| 11,983,933 B1* | 5/2024 | Pronovost | G06V 10/764 |
| 2020/0086861 A1* | 3/2020 | McGill, Jr. | G05D 1/0214 |
| 2021/0181754 A1* | 6/2021 | Cui | G06N 3/088 |
| 2023/0060005 A1* | 2/2023 | Jiang | G08G 1/096827 |

* cited by examiner

*Primary Examiner* — Brandon Z Willis
(74) *Attorney, Agent, or Firm* — Honigman LLP; Matthew H. Szalach; Jonathan P. O'Brien

(57) ABSTRACT

The present disclosure generally relates to autonomous vehicle (AV) prediction systems and in particular, to novel methods for training a prediction layer of the AV software stack. In some aspects, the disclosure can provide a process for receiving road data representing a plurality of entities, predicting, using a prediction layer of an autonomous vehicle (AV), a first set of future trajectories for one or more of the plurality of entities, and predicting, using a kinematics model, a second set of future trajectories for one or more of the plurality of entities. In some approaches, the process can further include steps for flagging one or more instances in the road data for which the first set of future trajectories is less accurate than the second set of future trajectories. Systems and machine-readable media are also provided.

20 Claims, 6 Drawing Sheets

DYNAMICALLY WEIGHTING TRAINING DATA USING KINEMATIC COMPARISON

BACKGROUND

1. Technical Field

The present disclosure generally relates to autonomous vehicle (AV) prediction systems and in particular, to training a prediction layer of the AV software stack.

2. Introduction

Autonomous vehicles (AVs) are vehicles having computers and control systems that perform driving and navigation tasks conventionally performed by human drivers. As AV technologies continue to advance, they will be increasingly used to improve transportation efficiency and safety. As such, AVs will need to perform many of the functions conventionally performed by human drivers, such as performing navigation and routing tasks necessary to provide safe and efficient transportation. Such tasks may require the collection and processing of large quantities of data using various sensor types, including but not limited to cameras and/or Light Detection and Ranging (LiDAR) sensors disposed on the AV. In some instances, the collected data can be used by the AV to perform tasks relating to routing, planning, and obstacle avoidance.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
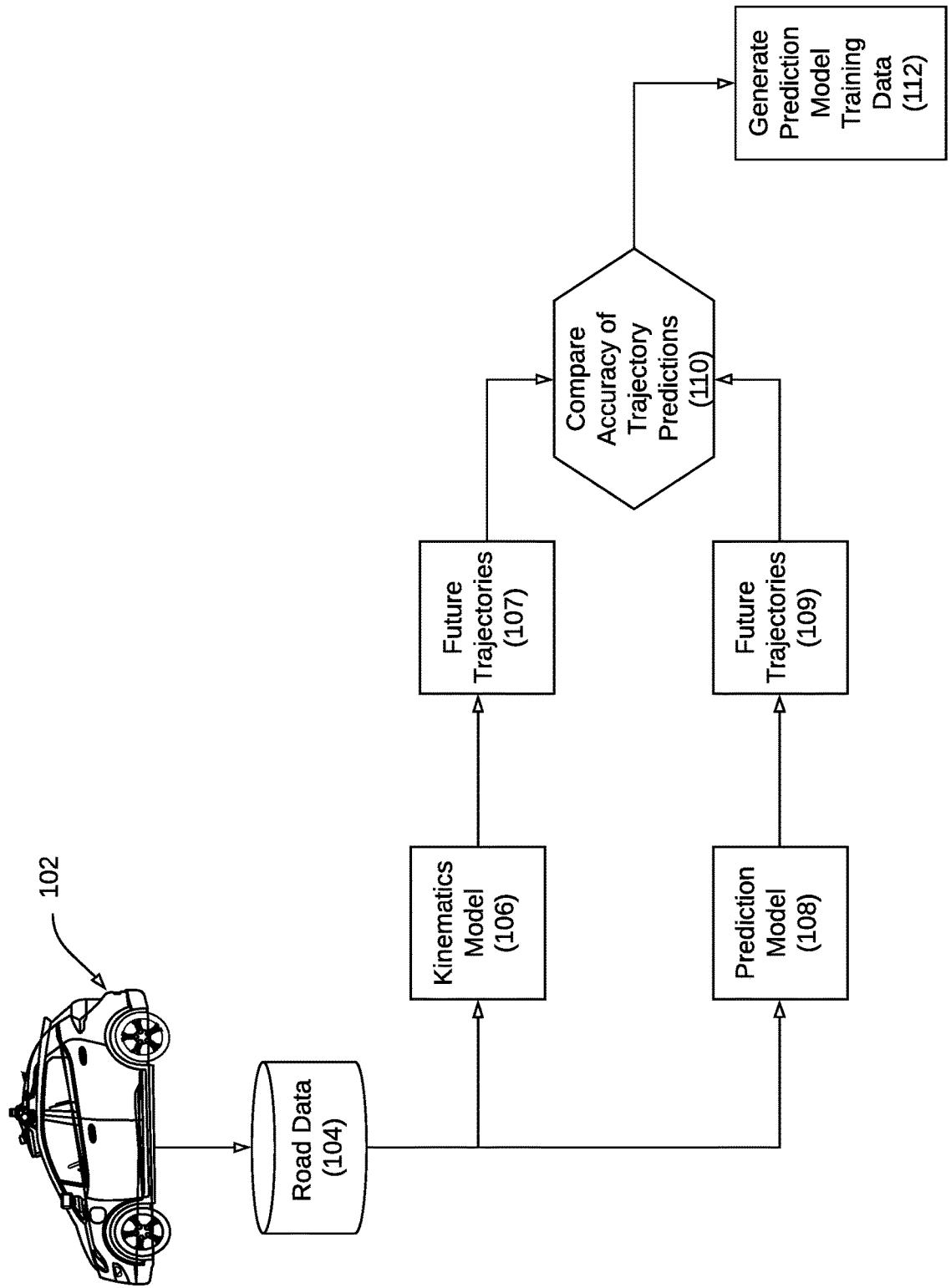
FIG. 1 illustrates an example system in which road data associated with autonomous vehicle (AV) operations can be used to generate training data for a prediction model of the AV software stack, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Some aspects of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Autonomous vehicles (AVs) utilize a variety of software modules to perceive and reason about the environments in which they navigate. In some AV deployments, the AV software (or AV software stack) can include modules (or layers) to perform perception, prediction, and planning. In such implementations, the perception layer can be responsible for receiving sensor data and, using the sensor data, identifying the locations and types of objects in the surrounding environment. Object identification can include the identification of static objects, such as buildings, road signs, and/or topographical features (e.g., roadways, cross walks, parking areas, etc.), as well as the identification of dynamic objects, such as various roadway entities, such as vehicles, and pedestrians, etc. Objects, such as variously encountered entities, identified by the perception layer can be output to downstream modules/layers, such as the prediction layer and/or the planning layer.

In some implementations, the prediction layer is responsible for estimating/predicting object trajectories or locations at future times. For example, the prediction layer can be configured to predict trajectories for various other entities (e.g., vehicles or other traffic participants) encountered by the AV and represented in the collected sensor data or road data. As used herein, road data can refer to all data collected (recorded) by an AV (or multiple AVs in a fleet) during operation, including map metadata, sensor data, weather data, and various other types of data accessed, collected or received by the AV during its operation. Depending on the desired implementation, trajectory predictions for a given entity can be represented as location estimates for the entity at discrete future time points. For example, trajectories for each entity can be computed at 0.50 second intervals for up to 9 seconds into the future. However, it is understood that other time intervals (e.g., 0.25 seconds, 0.125 seconds, etc.) or future projected time periods (e.g., 18 seconds, 30 seconds, etc.), may be used without departing from the scope of the disclosed technology.

Predicted trajectories can be used by the planning layer (or planning module) to determine an optimal path for the AV. Path selection (also referred to herein as route selection) can be based on multiple constraints, including but not limited to computed metrics for passenger safety, comfort, and/or route efficiency, etc. In some approaches, multiple possible paths (or path plans) for the AV may be computed, where each path can be associated with cost metrics that account for the variously associated factors, such as safety, comfort, and/or efficiency, etc. Path selection can then be performed by selecting a route (from among multiple path plans) associated with the lowest cost, e.g., to ensure maximal rider safety, comfort and/or overall satisfaction.

One difficulty in optimizing AV navigation and routing operations is that the planning layer may sometimes incorrectly estimate trajectories for variously encountered entities. In some instances, the planning layer can be (or can include) one or more machine-learning models, e.g., that are configured to generate future trajectory estimates for various entities encountered by the AV. In such instances, it would be useful to identify the situations in which the machine-learning (ML) models underperform, and to dynamically weight problematic (low accuracy) instances for further training. As discussed in further detail below, the automatic dynamic weighting of training examples can be performed by increasing a training frequency and/or increasing associated weights for specific entity encounters (e.g., to increase training impact), for those instances that are deemed to be problematic for the prediction layer.

In some approaches, kinematics models, which can be configured to estimate future entity locations and velocities (e.g., trajectories), can be used to assess planning layer performance. For example, a future trajectory estimated by a kinematics model can be compared to a future trajectory, for the same entity, that is predicted by the planning module, e.g., to evaluate planning module performance. Underperformance of the prediction module may be indicated in instances in which estimates generated by the kinematics model are determined to be more accurate than those generated by the planning layer. Such instances can be flagged (or tagged with metadata) for use in further training of the ML model/s of the planning layer.

FIG. 1 illustrates an example system 100 in which road data associated with autonomous vehicle (AV) operations can be used to generate training data for a prediction model (e.g., a machine-learning model) of the AV software stack. Although the example of FIG. 1 illustrates the receipt of road data 104 from a single AV (e.g., AV 102), it is understood that road data 104 can represent data collected by multiple AVs, for example, during driving operations performed at different times and/or locations. Collected road data 104 can include information representing various objects, entities, and scenes encountered by AV 102. By way of example, road data 104 can include sensor data representing various other entities (vehicles, pedestrians, and/or other dynamic objects, etc.), including but not limited to LiDAR data, RADAR data, camera image data, and the like. Road data 104 can also include data representing results generated by different layers of the AV software stack, for example, that were used to make navigation and routing decisions. By way of example, road data 104 can include object detections (including bounding boxes, kinematic information, semantic labels etc.), as well as outputs from different processing layers of the AV software stack, such as entity trajectory predictions. As such, road data 104 can include outputs from the AV's perception and planning layers, including but not limited to data identifying objects and entities encountered by AV 102, data describing entity trajectory predictions (e.g., made by the planning layer), and/or data describing actual trajectories followed by the observed entities.

In some approaches, at least a part of the road data 104 can be provided as an input to a kinematics model, for example, to make (a second set of) trajectory predictions relating to various entities represented in the road data, such as other traffic participants and/or pedestrians, etc. The kinematics model/s 106 can be based on predetermined position, velocity, and/or acceleration functions that can be used to predict (forecast) the location and/or kinematic properties of a given entity at specific future times. Depending on the implementation, the kinematics model/s may be significantly less complex than the prediction model 108. Kinematics model 106 may be used to predict a future location and/or velocity of a given entity (or other dynamic object) at 0.5 second intervals, e.g., for up to 3 seconds or 9 seconds into the future. It is understood that other prediction intervals (e.g., every 0.25 seconds) and/or durations into the future (e.g., 15 seconds or 30 seconds), may be used, without departing from the scope of the disclosed technology.

Predictions of the kinematics model 106, for any given entity, can be based on location and kinematic characteristic information (velocity, acceleration, jerk, etc.) for the entity. Kinematics predictions made by kinematics model 106 can be used to output future trajectory predictions 107 for one or more of the entities represented in the road data 104.

Road data 104 can also be provided to a machine-learning (ML) based prediction layer 108, for example, that is implemented as part of the AV's 102 software stack. The prediction layer can be configured to receive information regarding one or more entities (such as location and kinematics information) in addition to other information contained in the road data 104, such as contextual information about objects around (or proximate to) a given entity, and high-level perception information about entities in the environment, e.g., to generate a first set of trajectory predictions. By way of example, contextual information associated with a given entity (as represented in road data 104) may include (but is not limited to) semantic map information indicating the placement (or relative placement) of a given entity with respect to features in the surrounding environment, such as roadways, crosswalks, traffic control lights, traffic control signs, and/or emergency vehicles, etc. High-level perception information about entities in the environment may include, but is not limited to, information identifying classifying entity behavior, entity type (e.g., a car, a motorcycle, and/or an emergency vehicle etc.).

Information received by prediction layer 108 can be used by the ML-based prediction layer to generate its own independent trajectory predictions 109 for the entities represented in road data 104. The second set of trajectory predictions generated by kinematics model 106 can then be compared with the first set of trajectory predictions generated by prediction layer 108 e.g., at processing step 110. In some instances, both trajectory prediction sets can be compared to (ground-truth) entity trajectories recorded by AV 102, for example, and represented in road data 104. Through comparison with actual (recorded) entity trajectories, the relative accuracy of each trajectory prediction set can be evaluated. For example, for some instances (entities) the second set of trajectory predictions (produced by the kinematics model) may be more accurate than those of the first set produced by prediction layer 108, whereas for other entities (instances) the first set of trajectory predictions (produced by prediction layer 108) may be more accurate.

In some approaches, instances where trajectory predictions of prediction layer 108 are less accurate than those of the kinematics model 106 can be used to identify scenarios (represented in road data 104) that may be useful in further training prediction layer 108. By way of example, such instances may be flagged (e.g., by association with metadata tags, or timestamp logging) such that relevant portions of road data 104 can be used for further training of prediction layer 108. By way of example, if Euclidean distances between predictions made by kinematics model 106 and ground truth data (represented in road data 104) are smaller than (e.g., less than) Euclidean distances between predictions made by prediction model 108 and the ground truth data, then those instances may represent training examples that could further benefit the training of prediction model 108.

Figure 2:
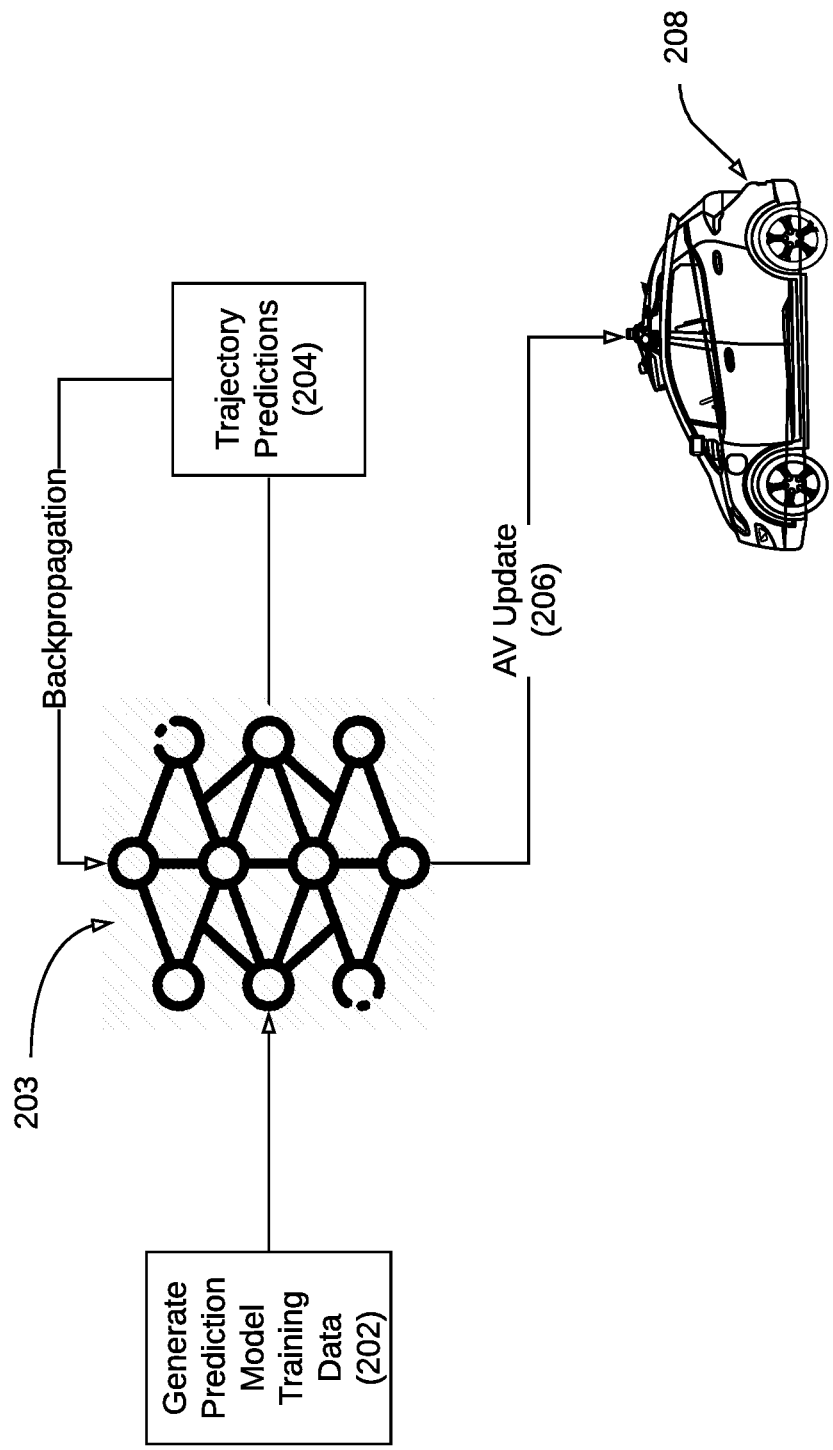
FIG. 2 illustrates an example system for training a prediction model of the AV software stack and for updating software of an AV to improve prediction performance, according to some aspects of the disclosed technology.

FIG. 2 illustrates an example system 200 for training a prediction model of the AV software stack and for updating software of an AV to improve prediction performance. At block 202, training data 112 can be provided to one or more ML models of prediction layer 203. In some instances, prediction layer 203 can represent the same software implemented/running on AV 102 (see FIG. 1). In other instances, prediction layer 203 can represent the same prediction layer software version, or another version, without departing from the scope of the disclosed technology. Depending on the desired implementation, training data 112 can be weighted (or re-weighted) to prioritize training for trajectory prediction instances and associated driving scenarios in which prediction layer 108 was less accurate than kinematics model 106. By way of example, those instances in which prediction layer 108 underperformed kinematics model 106 may be given greater training weight and/or training frequency when provided to ML model 203, e.g., as part of training dataset 202. By way of example, instances in which prediction layer 108 underperformed kinematics model 106 may be provided (repeatedly) as training data in when additional training is performed on prediction layer 108. As the accuracy of prediction layer 108 improves for those training instances, the weight and/or frequency associated to those instances during training may be decreased.

Trajectory predictions 204 generated by prediction layer 203 can be evaluated (e.g., using an error function), and any discrepancy between predicted and actual entity trajectories can be back propagated to update/train prediction layer 203. Further details regarding ML architecture and the training process are discussed with respect to FIG. 4, below. Once ML model 203 has been trained (or re-trained), the ML model 203 can be provided to AV 208, e.g., as part of an update to the software stack of AV 208.

Figure 3:
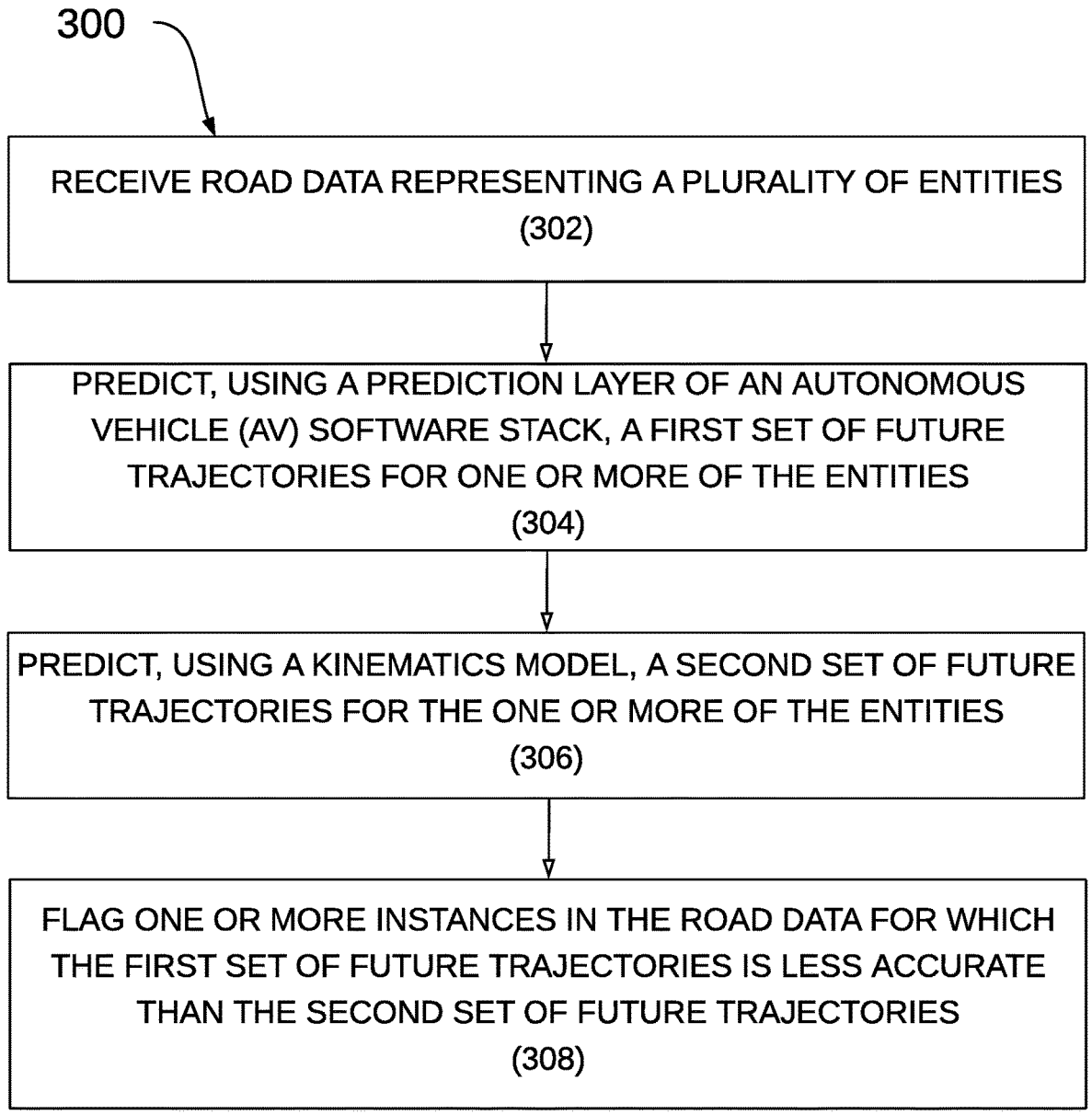
FIG. 3 illustrates steps of an example process for segmenting training data from autonomous vehicle road data, according to some aspects of the disclosed technology.

FIG. 3 illustrates steps of an example process 300 for segmenting training data from autonomous vehicle road data. At step 302, process 300 includes receiving road data representing a plurality of entities. The road data can include any (and all) data collected (recorded) by an AV (or multiple AVs in a fleet) during operation, including map metadata, sensor data, weather data, and various other types of data accessed, collected and/or received by the AV during its operation.

At step 304, process 300 includes predicting, using a prediction layer of an autonomous vehicle (AV) software stack, a first set of future trajectories for one or more of the plurality of entities. As discussed above, the first set of future trajectories can be predicted based on a variety of input data contained in (or extracted from) the road data. By way of example, the prediction layer can be configured to receive information regarding one or more entities (such as location and kinematics information) in addition to other information contained in the road data, such as contextual information about objects around (or proximate to) a given entity, and high-level perception information about entities in the environment, e.g., to generate a first set of trajectory predictions. By way of example, contextual information associated with a given entity may include (but is not limited to) semantic map information indicating the placement (or relative placement) of a given entity with respect to features in the surrounding environment, such as roadways, crosswalks, traffic control lights, traffic control signs, and/or emergency vehicles, etc. High-level perception information about entities in the environment may include, but is not limited to, information identifying classifying entity behavior, entity type (e.g., a car, a motorcycle, and/or an emergency vehicle etc.). In some instances, historical information, including previous locations, kinematic behaviors, and/or driving behaviors of the entities may be used to predict their future trajectories.

At step 306, process 300 includes predicting, using a kinematics model, a second set of future trajectories for one or more of the plurality of entities. As discussed above, the kinematics models can include models or equations for computing position, velocity, and/or acceleration for the (one or more) entities, for example, at various times in the future. In some instances, the kinematics model/s can be significantly less complex than the prediction layer (or prediction model) of the AV software stack.

At step 308, process 300 includes flagging one or more instances in the road data for which the first set of future trajectories is less accurate than the second set of future trajectories. As discussed above, both trajectory prediction sets can be compared to (ground-truth) entity trajectories (also: ground-truth trajectory data) recorded by the AV, for example, and represented in the road data. The ground-truth trajectory data can include (actual) recorded trajectories of one or more entities after a time when then future trajectory predictions were made. Through comparison with actual (recorded) entity trajectories, the relative accuracy of each trajectory prediction set can be evaluated. For example, for some instances (or for some entities) the second set of trajectory predictions (produced by the kinematics model) may be more accurate than those of the first set produced by the prediction layer, whereas for other entities (instances) the first set of trajectory predictions (produced by prediction layer) may be more accurate. In such instances, training can be enhanced, e.g., by increasing the weight and/or frequency of training using those instances.

By way of example, the flagged instances (e.g., in which the prediction layer is less accurate than the kinematics model) can be extracted/segmented and used to perform additional training on one or more ML models of the prediction layer. During this subsequent training, the newly generated (or newly revised) training data may be given greater weight, e.g., so that instances (or driving scenarios) in which the prediction model underperforms (with respect to the kinematics model) produce greater changes/updates to the prediction model. Additionally (or alternatively), the newly generated training data may be used to train at a higher frequency, e.g., by increasing a number of exposures to the prediction layer during training. The training weight and/or training frequency for any training instance can be reduced, for example, as prediction layer accuracy improves over time.

Figure 4:
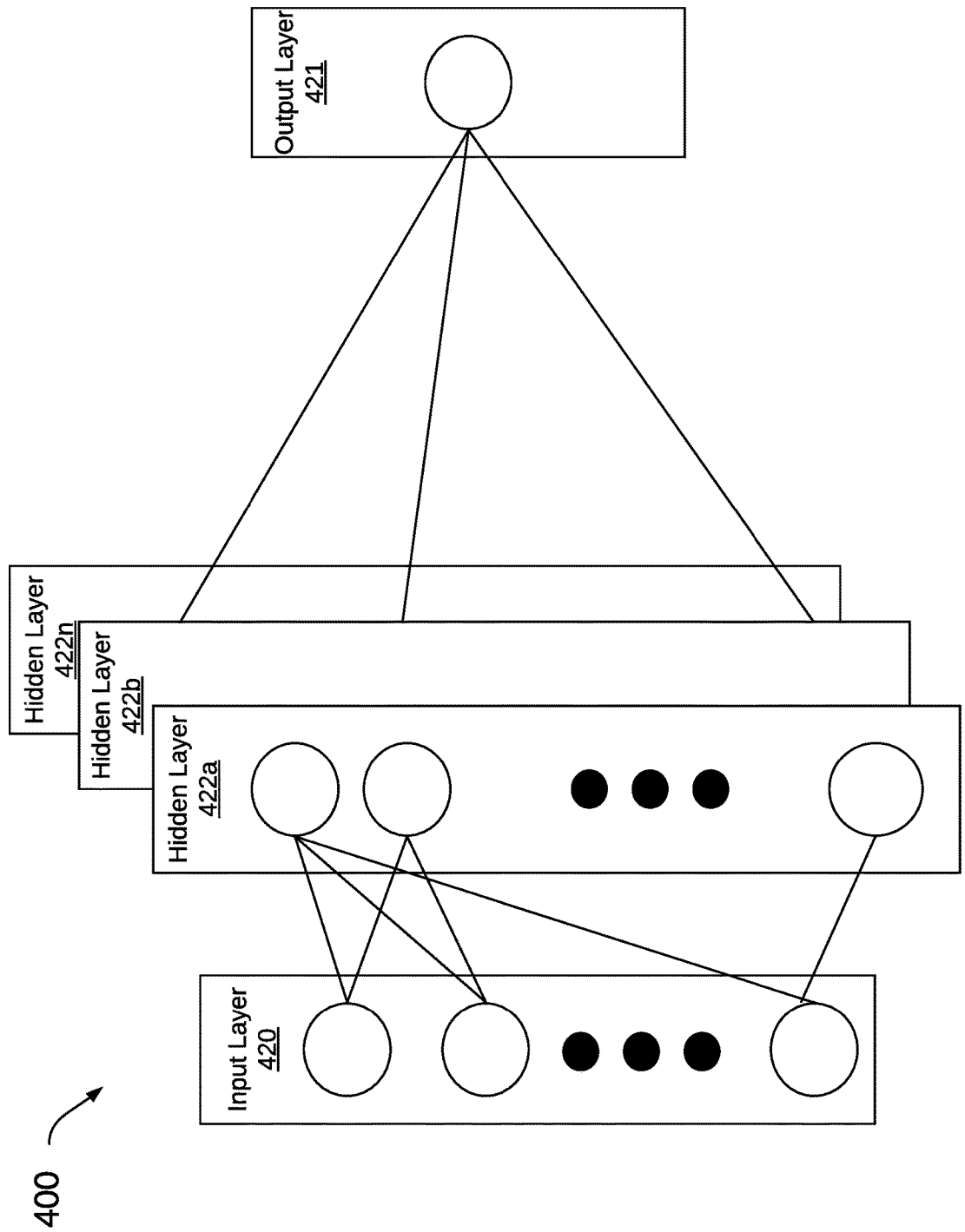
FIG. 4 illustrates an example of a deep learning neural network that can be used to implement a prediction layer of the AV software stack, according to some aspects of the disclosed technology.

In FIG. 4, the disclosure now turns to a further discussion of models that can be used through the environments and techniques described herein. FIG. 4 is an example of a deep learning neural network 400 that can be used to implement all, or a portion of the systems and techniques described herein e.g., neural network 400 can be used to implement a prediction module (or prediction system) as discussed above. An input layer 420 can be configured to receive sensor data and/or data relating to an environment surrounding an AV. Neural network 400 includes multiple hidden layers 422a, 422b, through 422n. The hidden layers 422a, 422b, through 422n include "n" number of hidden layers, where "n" is an integer greater than or equal to one. The number of hidden layers can be made to include as many layers as needed for the given application. Neural network 400 further includes an output layer 421 that provides an output resulting from the processing performed by the hidden layers 422a, 422b, through 422n.

The neural network 400 is a multi-layer neural network of interconnected nodes. Each node can represent a piece of information. Information associated with the nodes is shared among the different layers and each layer retains information as information is processed. In some cases, the neural network 400 can include a feed-forward network, in which case there are no feedback connections where outputs of the network are fed back into itself. In some cases, the neural network 400 can include a recurrent neural network, which can have loops that allow information to be carried across nodes while reading in input.

Information can be exchanged between nodes through node-to-node interconnections between the various layers. Nodes of the input layer 420 can activate a set of nodes in the first hidden layer 422a. For example, as shown, each of the input nodes of the input layer 420 is connected to each of the nodes of the first hidden layer 422a. The nodes of the first hidden layer 422a can transform the information of each input node by applying activation functions to the input node information. The information derived from the transformation can then be passed to and can activate the nodes of the next hidden layer 422b, which can perform their own designated functions. Example functions include convolutional, up-sampling, data transformation, and/or any other suitable functions. The output of the hidden layer 422b can then activate nodes of the next hidden layer, and so on. The output of the last hidden layer 422n can activate one or more nodes of the output layer 421, at which an output is provided. In some cases, while nodes in the neural network 400 are shown as having multiple output lines, a node can have a single output and all lines shown as being output from a node represent the same output value.

In some cases, each node or interconnection between nodes can have a weight that is a set of parameters derived from the training of the neural network 400. Once the neural network 400 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 400 to be adaptive to inputs and able to learn as more and more data is processed.

The neural network 400 is pre-trained to process the features from the data in the input layer 420 using the different hidden layers 422a, 422b, through 422n to provide the output through the output layer 421.

In some cases, the neural network 400 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 400 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma(\frac{1}{2}(target-output)^2)$. The loss can be set to be equal to the value of E_total. The loss (or error) may be high for the initial training data since the actual values will be much different than the predicted output. The goal of training is to minimize the amount of loss so that the predicted output is the same as the training output. The neural network 400 can perform a backward pass by determining which inputs (weights) most contributed to the loss of the network, and can adjust the weights so that the loss decreases and is eventually minimized.

The neural network 400 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 400 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 5:
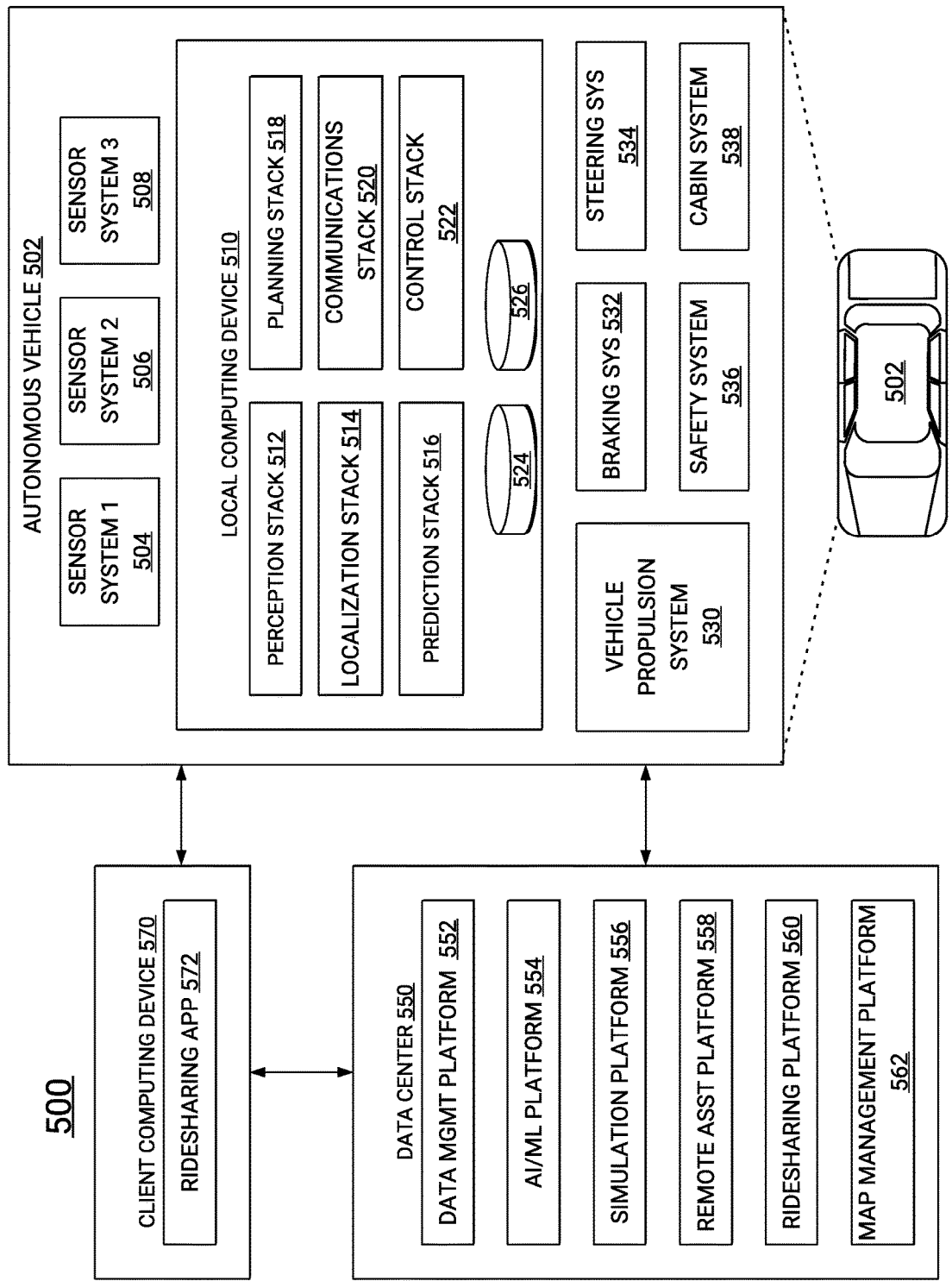
FIG. 5 illustrates an example system environment that can be used to facilitate autonomous vehicle (AV) dispatch and operations, according to some aspects of the disclosed technology.

FIG. 5 is a diagram illustrating an example autonomous vehicle (AV) environment 500, according to some examples of the present disclosure. One of ordinary skill in the art will understand that, for the AV environment 500 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 502 can navigate roadways without a human driver based on sensor signals generated by multiple sensor systems 504, 506, and 508. The sensor systems 504-508 can include one or more types of sensors and can be arranged about the AV 502. For instance, the sensor systems 504-508 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other examples may include any other number and type of sensors.

The AV 502 can also include several mechanical systems that can be used to maneuver or operate the AV 502. For instance, the mechanical systems can include a vehicle propulsion system 530, a braking system 532, a steering system 534, a safety system 536, and a cabin system 538, among other systems. The vehicle propulsion system 530 can include an electric motor, an internal combustion engine, or both. The braking system 532 can include an engine brake, brake pads, actuators, and/or any other suitable componentry configured to assist in decelerating the AV 502. The steering system 534 can include suitable componentry configured to control the direction of movement of the AV 502 during navigation. The safety system 536 can include lights and signal indicators, a parking brake, airbags, and so forth. The cabin system 538 can include cabin temperature control systems, in-cabin entertainment systems, and so forth. In some examples, the AV 502 might not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

The AV 502 can include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a localization stack 514, a prediction stack 516, a planning stack 518, a communications stack 520, a control stack 522, an AV operational database 524, and an HD geospatial database 526, among other stacks and systems.

The perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the localization stack 514, the HD geospatial database 526, other components of the AV, and other data sources (e.g., the data center 550, the client computing device 570, third party data sources, etc.). The perception stack 512 can detect and classify objects and determine their current locations, speeds, directions, and the like. In addition, the perception stack 512 can determine the free space around the AV 502 (e.g., to maintain a safe distance from other objects, change lanes, park the AV, etc.). The perception stack 512 can identify environmental uncertainties, such as where to look for moving objects, flag areas that may be obscured or blocked from view, and so forth. In some examples, an output of the perception stack 512 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The localization stack 514 can determine the AV's position and orientation (pose) using different methods from multiple systems (e.g., GPS, IMUs, cameras, LIDAR, RADAR, ultrasonic sensors, the HD geospatial database 526, etc.). For example, in some cases, the AV 502 can compare sensor data captured in real-time by the sensor systems 504-508 to data in the HD geospatial database 526 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

The prediction stack 516 can receive information from the localization stack 514 and objects identified by the perception stack 512 and predict a future path for the objects. In some examples, the prediction stack 516 can output several likely paths that an object is predicted to take along with a probability associated with each path. For each predicted path, the prediction stack 516 can also output a range of points along the path corresponding to a predicted location of the object along the path at future time intervals along with an expected error value for each of the points that indicates a probabilistic deviation from that point.

The planning stack 518 can determine how to maneuver or operate the AV 502 safely and efficiently in its environment. For example, the planning stack 518 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another and outputs from the perception stack 512, localization stack 514, and prediction stack 516. The planning stack 518 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 518 can select from multiple backup plans to carry out. For example, while preparing to change lanes to turn right at an intersection, another vehicle may aggressively cut into the destination lane, making the lane change unsafe. The planning stack 518 could have already determined an alternative plan for such an event. Upon its occurrence, it could help direct the AV 502 to go around the block instead of blocking a current lane while waiting for an opening to change lanes.

The control stack 522 can manage the operation of the vehicle propulsion system 530, the braking system 532, the steering system 534, the safety system 536, and the cabin system 538. The control stack 522 can receive sensor signals from the sensor systems 504-508 as well as communicate with other stacks or components of the local computing device 510 or a remote system (e.g., the data center 550) to effectuate operation of the AV 502. For example, the control stack 522 can implement the final path or actions from the multiple paths or actions provided by the planning stack 518. This can involve turning the routes and decisions from the planning stack 518 into commands for the actuators that control the AV's steering, throttle, brake, and drive unit.

The communications stack 520 can transmit and receive signals between the various stacks and other components of the AV 502 and between the AV 502, the data center 550, the client computing device 570, and other remote systems. The communications stack 520 can enable the local computing device 510 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 520 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 526 can store HD maps and related data of the streets upon which the AV 502 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 524 can store raw AV data generated by the sensor systems 504-508, stacks 512-522, and other components of the AV 502 and/or data received by the AV 502 from remote systems (e.g., the data center 550, the client computing device 570, etc.). In some examples, the raw AV data can include HD LIDAR point cloud data, image data, RADAR data, GPS data, and other sensor data that the data center 550 can use for creating or updating AV geospatial data or for creating simulations of situations encountered by AV 502 for future testing or training of various machine learning algorithms that are incorporated in the local computing device 510.

The data center 550 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 550 can include one or more computing devices remote to the local computing device 510 for managing a fleet of AVs and AV-related services. For example, in addition to managing the AV 502, the data center 550 may also support a ridehailing service (e.g., a ridesharing service), a delivery service, a remote/roadside assistance service, street services (e.g., street mapping, street patrol, street cleaning, street metering, parking reservation, etc.), and the like.

The data center 550 can send and receive various signals to and from the AV 502 and the client computing device 570. These signals can include sensor data captured by the sensor systems 504-508, roadside assistance requests, software updates, ridehailing/ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, and a ridehailing platform 560, and a map management platform 562, among other systems.

The data management platform 552 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridehailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridehailing platform 560, the map management platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridehailing platform 560, the map management platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from a cartography platform (e.g., map management platform 562); modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridehailing platform 560 can interact with a customer of a ridehailing service via a ridehailing application 572 executing on the client computing device 570. The client computing device 570 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridehailing application 572. The client computing device 570 can be a customer's mobile computing device or a computing device integrated with the AV 502 (e.g., the local computing device 510). The ridehailing platform 560 can receive requests to pick up or drop off from the ridehailing application 572 and dispatch the AV 502 for the trip.

Map management platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes when necessary. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridehailing platform 560 may incorporate the map viewing services into the client application 572 to enable passengers to view the AV 502 in transit en route to a pick-up or drop-off location, and so on.

While the autonomous vehicle 502, the local computing device 510, and the autonomous vehicle environment 500 are shown to include certain systems and components, one of ordinary skill will appreciate that the autonomous vehicle 502, the local computing device 510, and/or the autonomous vehicle environment 500 can include more or fewer systems and/or components than those shown in FIG. 5. For example, the autonomous vehicle 502 can include other services than those shown in FIG. 5 and the local computing device 510 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 5. An illustrative example of a computing device and hardware components that can be implemented with the local computing device 510 is described below with respect to FIG. 6.

Figure 6:
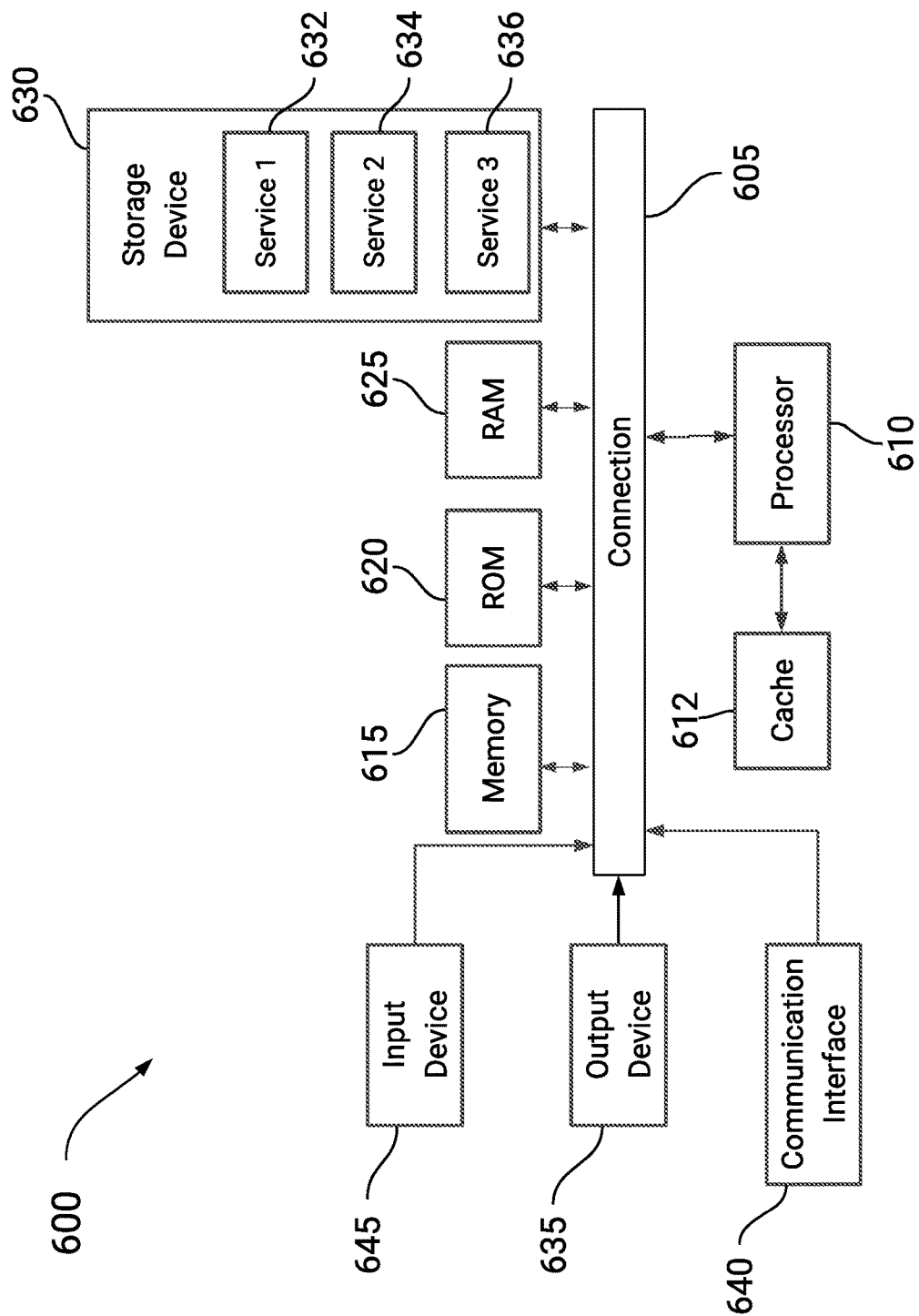
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. An apparatus comprising:
   at least one memory storing instructions; and
   at least one processor coupled to the at least one memory, wherein the instructions, when executed by the at least one processor, cause the at least one processor to:
      receive road data representing a plurality of entities, wherein the road data comprises, for each of the plurality of entities, a corresponding actual trajectory;
      predict, using a machine learning (ML) based prediction layer of an autonomous vehicle (AV) software stack, a first set of future trajectories for one or more of the plurality of entities;
      predict, using a kinematics model, a second set of future trajectories for the one or more of the plurality of entities;
      flag, based on the corresponding actual trajectories, one or more instances in the road data for which the first set of future trajectories are is-less accurate than the second set of future trajectories;
      update the ML based prediction layer based on losses between the first set of future trajectories and the corresponding actual trajectories, wherein updating the ML based prediction layer comprises adjusting weights associated with one or more nodes of the ML based prediction layer, and wherein losses associated with the flagged one or more instances in the road data are prioritized during updating of the prediction layer; and
      deploy the updated ML based prediction layer to an AV for use in predicting trajectories of entities in an environment navigated by the AV.

2. The apparatus of claim 1, wherein to flag the one or more instances in the road data for which the first set of future trajectories are less accurate than the second set of future trajectories, comprises:
   comparing the first set of future trajectories and the second set of future trajectories to ground-truth trajectory data corresponding with the one or more entities.

3. The apparatus of claim 1, wherein losses associated with the flagged one or more instances in the road data are prioritized during updating of the prediction layer by:
   increasing a training weight associated with each of the flagged one or more instances in the road data for which the first set of future trajectories is less accurate than the second set of future trajectories.

4. The apparatus of claim 1, wherein losses associated with the flagged one or more instances in the road data are prioritized during updating of the prediction layer by:
   increasing a training frequency associated with each of the flagged one or more instances in the road data for which the first set of future trajectories is less accurate than the second set of future trajectories.

5. The apparatus of claim 1, wherein the prediction layer comprises a machine-learning model that is trained to estimate future locations for each of the plurality of entities.

6. The apparatus of claim 1, wherein each of the plurality of entities comprises a dynamic object in an environment navigated by the AV.

7. The apparatus of claim 1, wherein the road data comprises one or more of Light Detection and Ranging (LiDAR) sensor data, Radio Detection and Ranging (RADAR) sensor data, camera image data, or a combination thereof.

8. A computer-implemented method, comprising:
   receiving road data representing a plurality of entities, wherein the road data comprises, for each of the plurality of entities, a corresponding actual trajectory;
   predicting, using a machine learning (ML) based prediction layer of an autonomous vehicle (AV) software stack, a first set of future trajectories for one or more of the plurality of entities;
   predicting, using a kinematics model, a second set of future trajectories for the one or more of the plurality of entities;
   flagging, based on the corresponding actual trajectories, one or more instances in the road data for which the first set of future trajectories are less accurate than the second set of future trajectories;
   updating the ML based prediction layer based on losses between the first set of future trajectories and the corresponding actual trajectories, wherein updating the ML based prediction layer comprises adjusting weights associated with one or more nodes of the ML based prediction layer, and wherein losses associated with the flagged one or more instances in the road data are prioritized during updating of the prediction layer; and
   deploying the updated ML based prediction layer to an AV for use in predicting trajectories of entities in an environment navigated by the AV.

9. The computer-implemented method of claim 8, wherein flagging the one or more instances in the road data for which the first set of future trajectories are less accurate than the second set of future trajectories, comprises:
   comparing the first set of future trajectories and the second set of future trajectories to ground-truth trajectory data corresponding with the one or more entities.

10. The computer-implemented method of claim 8, wherein losses associated with the flagged one or more instances in the road data are prioritized during updating of the prediction layer by:
increasing a training weight associated with each of the flagged one or more instances in the road data for which the first set of future trajectories is less accurate than the second set of future trajectories.

11. The computer-implemented method of claim 8, wherein losses associated with the flagged one or more instances in the road data are prioritized during updating of the prediction layer by:
increasing a training frequency associated with each of the flagged one or more instances in the road data for which the first set of future trajectories is less accurate than the second set of future trajectories.

12. The computer-implemented method of claim 8, wherein the prediction layer comprises a machine-learning model that is trained to estimate future locations for each of the plurality of entities.

13. The computer-implemented method of claim 8, wherein each of the plurality of entities comprises a dynamic object in an environment navigated by the AV.

14. The computer-implemented method of claim 8, wherein the road data comprises one or more of Light Detection and Ranging (LiDAR) sensor data, Radio Detection and Ranging (RADAR) sensor data, camera image data, or a combination thereof.

15. A non-transitory computer-readable storage medium storing at least one instruction that, when executed, causes a computer or processor to:
receive road data representing a plurality of entities, wherein the road data comprises, for each of the plurality of entities, a corresponding actual trajectory;
predict, using a machine learning (ML) based prediction layer of an autonomous vehicle (AV) software stack, a first set of future trajectories for one or more of the plurality of entities;
predict, using a kinematics model, a second set of future trajectories for the one or more of the plurality of entities;
flag, based on the corresponding actual trajectories, one or more instances in the road data for which the first set of future trajectories are is-less accurate than the second set of future trajectories;
update the ML based prediction layer based on losses between the first set of future trajectories and the corresponding actual trajectories, wherein updating the ML based prediction layer comprises adjusting weights associated with one or more nodes of the ML based prediction layer, and wherein losses associated with the flagged one or more instances in the road data are prioritized during updating of the prediction layer; and
deploy the updated ML based prediction layer to an AV for use in predicting trajectories of entities in an environment navigated by the AV.

16. The non-transitory computer-readable storage medium of claim 15, wherein flagging the one or more instances in the road data for which the first set of future trajectories are is-less accurate than the second set of future trajectories comprises:
comparing the first set of future trajectories and the second set of future trajectories to ground-truth trajectory data corresponding with the one or more entities.

17. The non-transitory computer-readable storage medium of claim 15, wherein losses associated with the flagged one or more instances in the road data are prioritized during updating of the prediction layer by:
increasing a training weight associated with each of the flagged one or more instances in the road data for which the first set of future trajectories is less accurate than the second set of future trajectories.

18. The non-transitory computer-readable storage medium of claim 15, wherein losses associated with the flagged one or more instances in the road data are prioritized during updating of the prediction layer by:
increasing a training frequency associated with each of the flagged one or more instances in the road data for which the first set of future trajectories is less accurate than the second set of future trajectories.

19. The non-transitory computer-readable storage medium of claim 15, wherein the prediction layer comprises a machine-learning model that is trained to estimate future locations for each of the plurality of entities.

20. The non-transitory computer-readable storage medium of claim 15, wherein each of the plurality of entities comprises a dynamic object in an environment navigated by the AV.

\* \* \* \* \*